United States Patent
Hubbard

(10) Patent No.: US 6,961,170 B2
(45) Date of Patent: Nov. 1, 2005

(54) OPTICAL PARAMETRIC AMPLIFIER AND METHOD FOR IMPLEMENTING SAME

(76) Inventor: Jeffrey Miller Hubbard, 9228 Kristin La., Fairfax, VA (US) 22032

(*) Notice: Subject to any disclaimer, the term of this patent is extended or adjusted under 35 U.S.C. 154(b) by 0 days.

(21) Appl. No.: 10/803,989

(22) Filed: Mar. 19, 2004

(65) Prior Publication Data
US 2005/0206997 A1    Sep. 22, 2005

(51) Int. Cl.$^7$ .............................................. G02F 1/39
(52) U.S. Cl. ................................................... 359/330
(58) Field of Search ............... 359/326–332; 372/21–22

(56) References Cited

U.S. PATENT DOCUMENTS

| | | | |
|---|---|---|---|
| 6,384,963 B2 * | 5/2002 | Ackerman et al. | 359/334 |
| 2003/0067952 A1 * | 4/2003 | Tsukiji et al. | 372/36 |
| 2004/0257641 A1 * | 12/2004 | Legrand et al. | 359/334 |

* cited by examiner

Primary Examiner—John D. Lee
(74) Attorney, Agent, or Firm—Andrews Kurth LLP

(57) ABSTRACT

An apparatus and method for optically, parametrically amplifying a small-signal. A small-signal optical parametric amplifier (OPA) includes a narrowband pump source, means for suppressing stimulated Brillouin scattering (SBS) (e.g., a phase modulator), coupled to the narrowband pump source, a booster amplifier, coupled to the SBS-suppressed pump output, a bandpass filter, coupled to the booster amplifier, a low-loss coupler, coupled to the bandpass filter and the receiving end of a small-signal transmission line, and means for performing non-linear mixing, coupled to the injection coupler. The narrowband pump source produces a pump output. The booster amplifier amplifies the SBS-suppressed pump output to a sufficient power level for achieving parametric gain. The bandpass filter bandpass filters the amplified, SBS-suppressed pump output and suppresses amplified spontaneous emission (ASE) in the pump output. The low-loss coupler couples the filtered, amplified, SBS-suppressed pump output with a small-signal received from the small-signal transmission line. The non-linear mixing means parametrically amplifies the small-signal with the filtered, amplified, SBS-suppressed pump output to produce an amplified output signal.

38 Claims, 3 Drawing Sheets

OPTICAL PARAMETRIC AMPLIFIER AND METHOD FOR IMPLEMENTING SAME

TECHNICAL FIELD

The technical field is optical amplifiers, more particularly optical parametric amplifiers.

BACKGROUND

A parametric amplifier functions through a phenomenon known as four-wave mixing, in which a strong pump induces non-linear mixing in a gain medium. Through appropriate selection of gain media, parametric amplifiers may be implemented at radio frequencies or optical frequencies. Though comparatively complex to implement, parametric amplifiers offer the potential of nearly noiseless signal amplification. In the optical domain, the prior art has focused on the use of optical parametric amplifiers (OPA) as alternatives to Erbium- and Raman-based pre-amplification for reception of signals of moderate strength. Use of an OPA for quantum-limited reception calls for a different design from those reported in the prior art.

SUMMARY

An advantage is that the embodiments described herein overcome disadvantages of the prior art. A principal advantage of the embodiments described herein is that they overcome the noise figure penalties of the prior art. The embodiments presented herein also provide unequalled advantages in optical power handling, insertion loss, directivity, and back-reflection.

These advantages and others are achieved by a small-signal optical parametric amplifier (OPA). The small-signal OPA includes a narrowband pump source, means for suppressing stimulated Brillouin scattering (SBS) (e.g., a phase modulator), coupled to the narrowband pump source, a booster amplifier, coupled to the SBS-suppressed pump output, a bandpass filter, coupled to the booster amplifier, a low-loss coupler, coupled to the bandpass filter and the receiving end of a small-signal transmission line, and means for performing non-linear mixing, coupled to the injection coupler. The narrowband pump source produces a pump output. The booster amplifier amplifies the SBS-suppressed pump output to a sufficient power level for achieving parametric gain. The bandpass filter bandpass filters the amplified, SBS-suppressed pump output and suppresses amplified spontaneous emission (ASE) in the pump output. The low-loss coupler couples the filtered, amplified, SBS-suppressed pump output with a small-signal received from the small-signal transmission line. The non-linear mixing means parametrically amplifies the small-signal with the filtered, amplified, SBS-suppressed pump output to produce an amplified output signal.

These advantages and others are also achieved by a method for parametrically amplifying a small-signal. The method includes generating a narrowband pump output, suppressing stimulated Brillouin scattering (SBS) in the narrowband pump output, amplifying the SBS-suppressed pump output to a sufficient power level for achieving parametric gain, bandpass filtering the amplified, SBS-suppressed pump output, coupling the filtered, amplified, SBS-suppressed pump output with a small-signal received from a small-signal transmission line, and parametrically amplifying the small-signal with the filtered, amplified, SBS-suppressed pump output in a highly non-linear fiber (HNLF) to produce an amplified output signal. The bandpass filtering suppresses amplified spontaneous emission (ASE) in the pump output.

These advantages and others are also achieved by a method for making a small signal OPA. The method identifies an input small-signal band to be amplified, obtains specifications for an available highly non-linear fiber (HNLF), and sets a length of the HNLF. The method determines a minimum pump source power that will provide adequate gain for the length of HNLF and calculates a range of pump wavelengths that will provide gain across the input small-signal band. The method further specifies a pump source according to calculated pump wavelength range, determines appropriate parameters for a noise source and phase modulator, and specifies a source for the input small-signal, a booster amplifier, an injection coupler, and high-power filter. The method cuts the HNLF to the length set and constructs the small signal OPA. The constructing couples the pump source and noise source to inputs of the phase modulator, an output of the phase modulator to an input of the booster amplifier, an output of the booster amplifier and the input small-signal to inputs of the injection coupler, an output of the injection coupler to an input end of the HNLF, and an output end of the HNLF to an input of the high-power filter.

DESCRIPTION OF THE DRAWINGS

The detailed description will refer to the following drawings, wherein like numerals refer to like elements, and wherein.

DETAILED DESCRIPTION

Since four-wave mixing does not involve the generation of excited states that spontaneously decay through photon emission, an optical parametric amplifier (OPA) has the potential for virtually noiseless amplification of small input signals. A small signal OPA, such as the small signal OPA 10 illustrated in FIG. 1, may be used to extend the range of optical remote sensing and long-haul (both fiber optic and line of sight) communication systems. The small signal OPA works near the range (C-band) most frequently used by long-haul optical communications systems. An exemplary small signal is a 2.5 Gb/s signal arriving at the small signal OPA input at −51 dBm average power. This signal power is less than four dB above the theoretical limit for non-coherent Amplitude Shift Keying (ASK) detection. Ultimately, the performance of an ASK detection scheme using a small signal OPA as a preamplifier is limited only by the quantized nature of light: that is, by the probability that no photons will arrive during the sampling interval of a "one." For such small signals, the small signal OPA outperforms existing amplifier technology by seven to eight (7 to 8) dB of sensitivity. Moreover, as described below, the small signal OPA may be constructed from commercially available components.

It was determined that an important component of the small signal OPA for small signal reception is an extremely narrowband, spectrally pure pump source. Accordingly, an innovation of the small signal OPA described herein is the preferred use of a fiber laser as the pump source. Another innovation of the small signal OPA is the preferred use of a fused-fiber coarse wavelength division multiplexer for pump and signal injection. While placing limitations on the pump and signal frequencies, this multiplexer offers unequalled advantages in power handling, insertion loss, directivity, and back reflection. There are no known prior art OPAs that make use of these components or offer the performance of the small signal OPA described herein.

Figure 1:
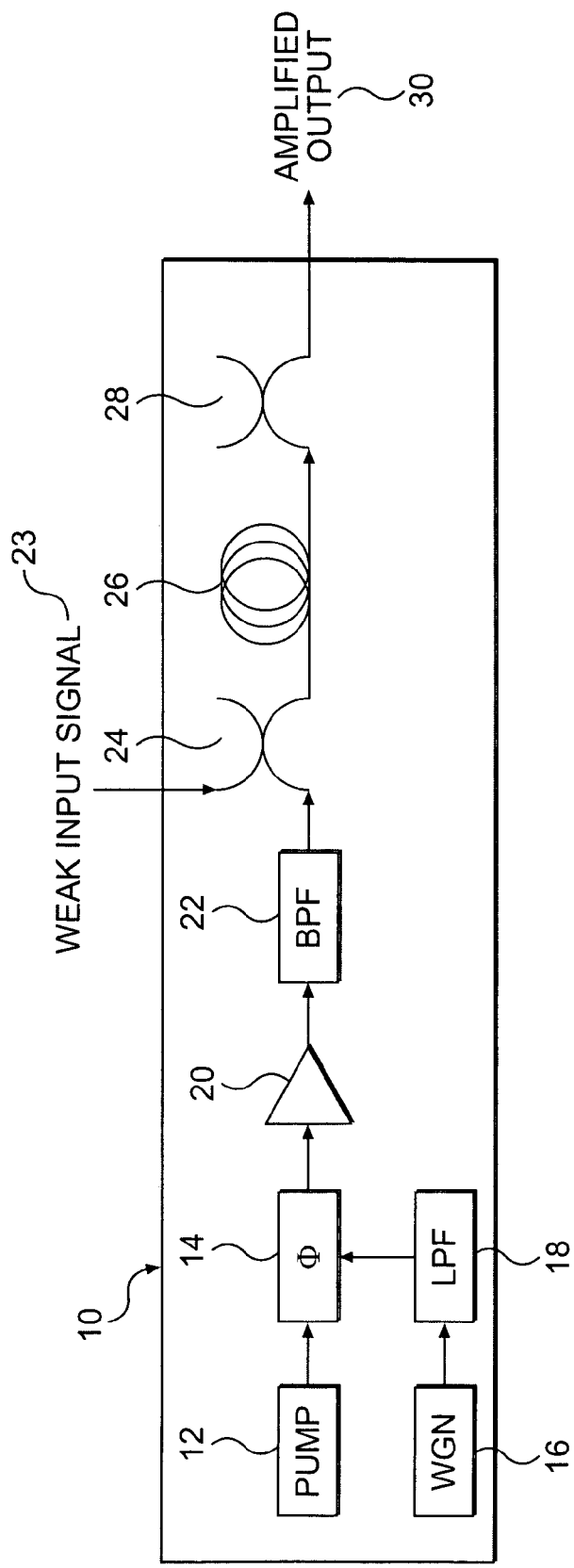
FIG. 1 is a block diagram illustrating an embodiment of a small signal optical parametric amplifier.

With reference now to FIG. 1, shown is an embodiment of the small signal OPA. The small signal OPA 10 is preferably placed near the receiver and is used to amplify the small telecommunications signal for reception. The small signal OPA 10 shown includes a Gaussian noise-modulated pump source 12 coupled into an erbium-doped fiber amplifier (EDFA) booster 20 with an amplified spontaneous emission (ASE) filter 22 at the output of the EDFA 20. The small signal OPA 10 is advantageous because it provides performance superior to other configurations and can be constructed with commercially available components. Moreover, since tunable fiber lasers, preferably used for the pump source 12, are available at the low power levels used in the small signal OPA 10, the small signal OPA 10 allows control of parametric frequency shift.

The pump source 12 is preferably a narrow linewidth (i.e., narrowband) pump with a power of +17 dBm. As discussed above, tunable fiber lasers are an ideal pump source 12. An exemplary pump source 12 is a Koheras Adjustik™ C15 fiber laser. The C15 fiber laser has a line width of 20 kHz at +17 dBm output power. Pump source 12 with larger line widths (e.g., up to 100 kHz) may be used. The C15 fiber laser may be tuned over approximately one nm.

A phase modulator 14 and a noise source 16 act as pump-broadening components. The pump spectrum is preferably broadened with a Gaussian noise source 16, or other broadband source, fed to the input of an optical phase modulator 14. The pump-broadening suppresses Stimulated Brillouin Scattering (SBS). An exemplary noise source 16 is an Agilent® 346C Gaussian noise source. The noise source 16 is preferably filtered with a lowpass filter 18, e.g., a Gaussian electrical lowpass filter with a 2.5 GHz cutoff frequency. An exemplary phase modulator 14 is a JDS Uniphase® (JDSU) optical phase modulator. The JDSU phase modulator 14 is rated for +23 dBm of optical power. Other phase modulators may also be used.

With continued reference to FIG. 1, the modulated pump output is preferably amplified by an EDFA 20. The EDFA 20 preferably has a saturated output power of one (1) W. Exemplary EDFAs 20 may be obtained from MPB Communications or IPG Photonics®. The relatively high power of the EDFA 20 is required to achieve parametric gain.

To effectively suppress ASE, however, the small signal OPA 10 preferably includes a bandpass ASE noise filter 22 at the output of the EDFA 20. The ASE filter 22 bandpass filters the amplified pump. A preferred ASE filter 22 includes three (3) fused coupler coarse wavelength division multiplexers (CWDMs) in series. JDSU supplies such fused coupler CWDMs, the JDSU CWM units. The JDSU CWM units have a 3 dB bandwidth of 2.1 THz, broad enough to allow for pump output wavelength drift and tuning. The CWDM can withstand the amplified pump output of one (1) W.

The ASE filter 22 implemented with three fused coupler CWDMs in series is a passive, low-cost option. An alternative ASE filter 22 is implemented with a tunable interferometric filter. Optune makes a tunable interferometric filter that can withstand one (1) W of optical power and offers 3 dB bandwidths as narrow as 0.2 nm with less than one (1) dB if insertion loss. The Optune tunable interferometric filter requires one (1) watt of DC power for wavelength tracking and actively tracks the pump wavelength.

With continued reference to FIG. 1, the amplified, ASE bandpass filtered pump output is preferably coupled to a weak input signal 23 with an injection coupler 24. The injection coupler 24 must be able to tolerate high power (e.g., one (1) W amplified pump output) with acceptable loss at both signal and pump frequencies. A preferred injection coupler 24 is a fused coupler CWDM. An exemplary CWDM is a JDSU four-channel fused coupler CWDM with center wavelengths of 1530, 1550, 1570, and 1590. The low reflectivity of the fused coupler CWDM helps to prevent pump reflections from de-stabilizing the input signal 23.

A highly non-linear fiber (HNLF) 26 is then used to amplify the small input signal 23 by four-wave mixing with the pump. The HNLF 26 has the affect of parametrically amplifying the input signal 23; as described below, the parametric gain provided to the input signal 23 depends on the product of the length of the HNLF 26 and the pump power. HNLF 26 is a specialty fiber that can be made to order or sold from stock. If sold from stock, the small signal OPA 10 will have to be designed with zero dispersion wavelength ($\lambda_0$) values of the HNLF 26 available. If made to order, the exact $\lambda_0$ desired may not be achievable. The $\lambda_0$ must be measured for each cut length of HNLF. HNLF typically costs about $10/meter. The per-meter price might be reduced somewhat if the entire pre-form is paid for. The desirable length of the HNLF 26 is preferably determined on an application-by-application basis, as discussed below. HNLF is readily available with a non-linear parameter, $\gamma$, of 20 per watt-kilometer. An exemplary HNLF 26 is Sumitomo's HNLF, which has an effective core area of ten square microns ($\mu^2$). The HNLF 26 is pre-terminated by the manufacturer with a standard fiber for low splice loss.

The amplified signal output from the HNLF 26 is preferably filtered with a high-power filter 28 to produce the amplified output 30. The high-power filter 28 preferably can withstand at least one (1) W of power (e.g., the power of the amplified input signal) while providing enough pump isolation to allow the subsequent use of a narrowband bandpass filter. An ideal high-power filter 28 is the fused coupler CWDM discussed above. The JDSU CWM is an exemplary fused coupler CWDM. At a 20 nm separation between pump output and input signal 23, the JSDU CWM provides about 10 dB of pump isolation, which is sufficient to allow the use of a downstream narrowband bandpass filter.

Although not shown in FIG. 1, a narrowband filter is preferably used to filter the amplified output 30 downstream from the high-power filter 28 to reduce the pump power to at least 20 dB below the signal (or idler) power at the input to a receiver (not shown). Many standard products are available for this purpose. For example, two DiCon BFC-series thin film filters may be used in series to provide the narrowband filtering. Since the insertion loss of each filter is only 0.6 dB, the penalty for including two in series is small. The narrowband filter may be tunable or fixed.

While not part of the small signal OPA 10, the characteristics of the weak input signal 23 source can affect the amplified output 30 signal quality. An exemplary signal source is a NEC® NX8564 electroabsorption modulated laser source. This device has an 11 dB extinction ratio and side mode suppression of about 37 dB. Electroabsorption-modulated lasers with extinction ratios of 20 dB may be used for improved results. The small signal OPA 10 works well with signal sources using either non-return to zero (NRZ) or return to zero (RZ) coding. The input signal 23 source may be connected to the small signal OPA 10 with installed transmission fiber. The input signal 23 will accumulate chromatic dispersion and may be as low as −51 dBm at the input to the small signal OPA 10.

Similarly not part of the small signal OPA 10, the choice of a receiver can also affect the overall performance of a system utilizing the small signal OPA 10. For operation near the quantum limit, the temporal distribution of photons in the amplified output 30 arriving in the bit interval becomes important. If only one photon arrives, and it arrives at the very beginning or end of the bit epoch, a sampling receiver may interpret the received digit as a zero no matter how much the single photon is amplified. An ideal integrate-and-dump receiver would capture all energy in the bit interval, but in a real receiver the dump operation takes time. The receiver's job is made easier if the bit energy is concentrated around the center of the bit interval. An RZ input signal 23 provides this feature since the optical power level always returns to zero at the beginning and end of the bit epoch. RZ coding reduces bit error rate by concentrating power near the center of each bit interval. It is also important to track the optical Q-parameter, defined as where I and σ represent photodetector current and noise during one and zero bits, respectively. Q is, therefore, the height of the eye opening divided by the widths of the bottom and top rails, where these widths equate to noise. This quantity is referred to herein as "linear Q" and is used as the primary figure of merit for received signal quality. With Gaussian statistics, a linear Q of 6.0 allows demodulation at a $10^{-9}$ Bit Error Rate (BER).

With reference again to FIG. 1, the components required for the small signal OPA 10 may be laid out in a 3.5" rack chassis. The primary dc power requirement for the small signal OPA 10 would be approximately 15 watts. Vendor specifications from the exemplary components described above indicate that the small signal OPA 10 would be stable over a component operating temperature range of +15 to +50° C. It is assumed that this temperature range could be achieved passively through good chassis thermal design. The primary source of temperature sensitivity, however, is the pump source 12 (e.g., the Koheras fiber laser), which can be stabilized or temperature-tuned, over a 125 GHz range, with a thermoelectric cooler.

As mentioned above, the design of the small signal OPA 10 will vary according to the application and the characteristics of the components used, particularly the HNLF 26. The amount of amplification provided by the small signal OPA 10 depends on the product of the length of the HNLF 26 (L) and the pump source 12 power ($P_0$). Accordingly, each design will vary the length of the HNLF 26 based on the desired results of the application. A non-linear parameter of the HNLF, γ, determines the efficiency of power transfer from pump source 12 to input signal 23 and idler frequencies. For constant gain, the quantity $\gamma L P_0$ must be held constant. To provide an amplified output 30 signal strength of about −25 dBm, it was found that the dimensionless product $\gamma L P_0$ needs to be approximately 7,100. Considering both the physics of the four-wave mixing process and the availability of commercial components, this product is best achieved with HNLF lengths between 500 and 1,500 meters, which puts the pump power at the input to the HNLF between 0.22 W and 0.71 W, values achieved in the exemplary designs. Different amplified output 30 signal strengths can be achieved by varying these values.

When designing a small signal OPA 10 for a particular application, there are design guidelines, described as follows, that are preferably followed. For example, he parametric gain band, which depends on the relationship between the pump wavelength ($\lambda_P$) and the zero-dispersion wavelength ($\lambda_0$) of the HNLF 26, must cover the input signal 23 band. The angular frequency shift $\Omega_S = (2\gamma P_0/|\beta_2|)^{1/2}$, where γ is the non-linear parameter of the HNLF 26, $P_0$ is the pump power, and $\beta_P$ is the HNLF's group velocity dispersion parameter. This guideline has non-trivial implications for the small signal OPA 10 design. Since $\lambda_0$ cannot be controlled precisely by fiber manufacturers, as discussed above, and may change significantly when the fiber is cut, the pump source 12 wavelength should be selected only after the specific length of HNLF 26 has been cut and measured. A tunable pump source 12 (e.g., a tunable fiber laser) may be used to compensate for uncertainties in $\lambda_0$, but fixed pump sources 12 (e.g., a fixed fiber laser) can also be used if $\lambda_0$ is known. Because of the uncertainty in $\lambda_0$, it is advisable to specify $\lambda_0$ at least 5 nm from the nearest edge of the input signal band. The guard band between C band and L band can be used for this purpose.

A further guideline states that, to achieve good signal-to-noise performance, high order in-band mixing products must be suppressed. These high order products result from multiple closely spaced pumps or from spurious spectral components in the pump output or input signal 23. Narrowband pump sources 12 with line widths of 100 kHz or less are recommended.

Still another guideline states that the pump spectrum must be broadened or other design measures must be taken to suppress Stimulated Brillouin Scattering (SBS). Although other and/or more exotic techniques are available, such as described in J. Hansryd, F. Dross, M. Westlund, and P. A. Andrekson, "Increase of the SBS Threshold in a Short Highly Nonlinear Fiber by Applying a Temperature Distribution", Journal of Lightwave Technology, vol. 19, no. 11, November, 2001, an effective and easily implemented approach is to phase-modulate the pump with lowpass-filtered Gaussian noise. Commercial components are available for this purpose.

Likewise, another guideline states that the pump output, being at a much higher power level than the input signal 23, must be strongly suppressed prior to the receiver. High-power filters (e.g., high-power filter 28) may be required at the output of the HNLF 26, as many commercial filters are not specified to handle more than 300 mW, and pump output powers may exceed one watt.

The small signal OPA 10 gain is a function of the product of pump power $P_0$, HNLF 26 length L, and the HNLF 26 nonlinear parameter y. Thus, a good design rule is to establish the minimum value for this product, then hold it constant when experimenting with different designs (e.g., different lengths L, different pump power $P_0$, etc.). Since, as noted above, the $\lambda_0$ may change when the fiber is cut, this experimentation is better done with a modeling tool than in hardware. With HNLF costing about $10 per meter, it is tempting to shorten the gain medium (i.e., the HNLF 26) and increase pump source 10 power proportionately. However, shortening the HNLF 26 will tend to increase polarization dependence, requiring a polarization control scheme to stabilize gain. Also, higher power components tend to be larger and more costly than low-power components. If cost is no object, a low power design can be achieved by lengthening the HNLF 26, but ultimately a limit is reached where pump source 12 power is too low to create non-linear effects in the fiber core.

Figure 2:
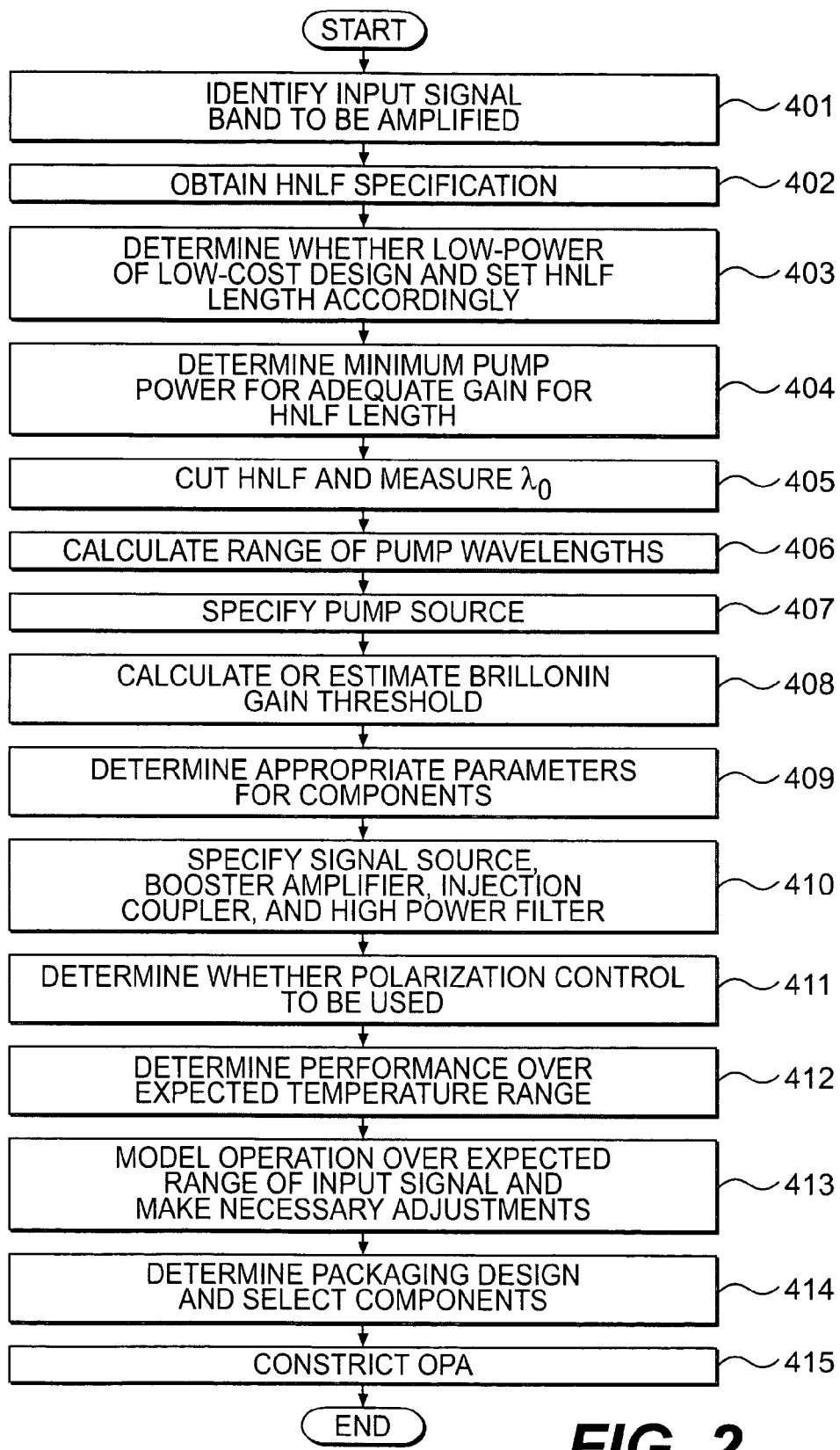
FIG. 2 is a flowchart illustrating an embodiment of a method for implementing a small signal optical parametric amplifier.

With reference now to FIG. 2, shown is a flowchart illustrating a method 40 for making a small signal OPA, such as small signal OPA 10, for operational use. The method 40 identifies the input signal 23 band to be amplified (block 401). Specifications for available HNLF 26 are obtained (block 402). The method 40 determines whether a low-power or low-cost design is to be pursued, and sets the HNLF 26 length accordingly (block 403) (e.g., shorter HNLF 26 length reduces cost and power). Using the results herein or other results, the method 40 determines the minimum pump source 12 power ($P_{0\ min}$) that will provide adequate gain for the length of HNLF 26 to be used (block 404). This step preferably includes using a modeling tool or a rough calculation to build in some margin on the pump source 12 power for laser aging and gain fluctuations. The method 40 further includes cutting the HNLF 26 and measuring the $\lambda_0$ of the HNLF 26 (block 405). Note that the $\lambda_{0\ min}$ may shift significantly when the HNLF 26 is cut. It is also preferable to have the HNLF 26 pre-terminated with adiabatic tapers to reduce splicing losses. Using the above values of pump power $P_{0\ min}$ and $\lambda_0$, the method 40 calculates the range of pump wavelengths that will provide gain across the signal band (block 406). A pump source 12 is specified accordingly (block 407). In most instances, a pump source 12 on the International Telecommunications Union (ITU) grid will be acceptable. Note that the parametric gain shift reported in literature texts corresponds approximately to the outer limit of the gain band; thus the gain shift should go slightly beyond the outer edge of the signal band to be amplified.

The method 40 preferably calculates or estimates the Brillouin gain threshold for the HNLF 26 (block 408), and determines the appropriate parameters for the Gaussian noise source, lowpass filter, and phase modulator (block 409). This step does not require great exactitude, as there is little size, cost, or power penalty to overbuilding the pump broadening section of the small signal OPA 10. The signal source, booster amplifier 20, injection coupler 24, and high-power filter 28 are specified (block 410). Note that either the signal or the idler (foldover image of the signal about the pump frequency) can be received. Preferably, the method 40 also determines whether or not polarization control will be used (block 411) and how the small signal OPA 10 will perform over the expected operating temperature range (block 412). Ideally, the method 40 also models the small signal OPA 10 operation over the expected range of input signal variation, and makes necessary adjustments based thereupon (block 413). When the modeling meets the expected performance, the method 40 determines the packaging design and select components (block 414). The small signal OPA 10 is then constructed using known procedures (block 415). For example, connecterization or pigtail splicing is preferably used where components being connected have matching fiber types. If the HNLF 26 is not provided with pre-terminated adiabatic tapers, it is preferably fusion spliced with a high quality fusion splicer.

Figure 3:
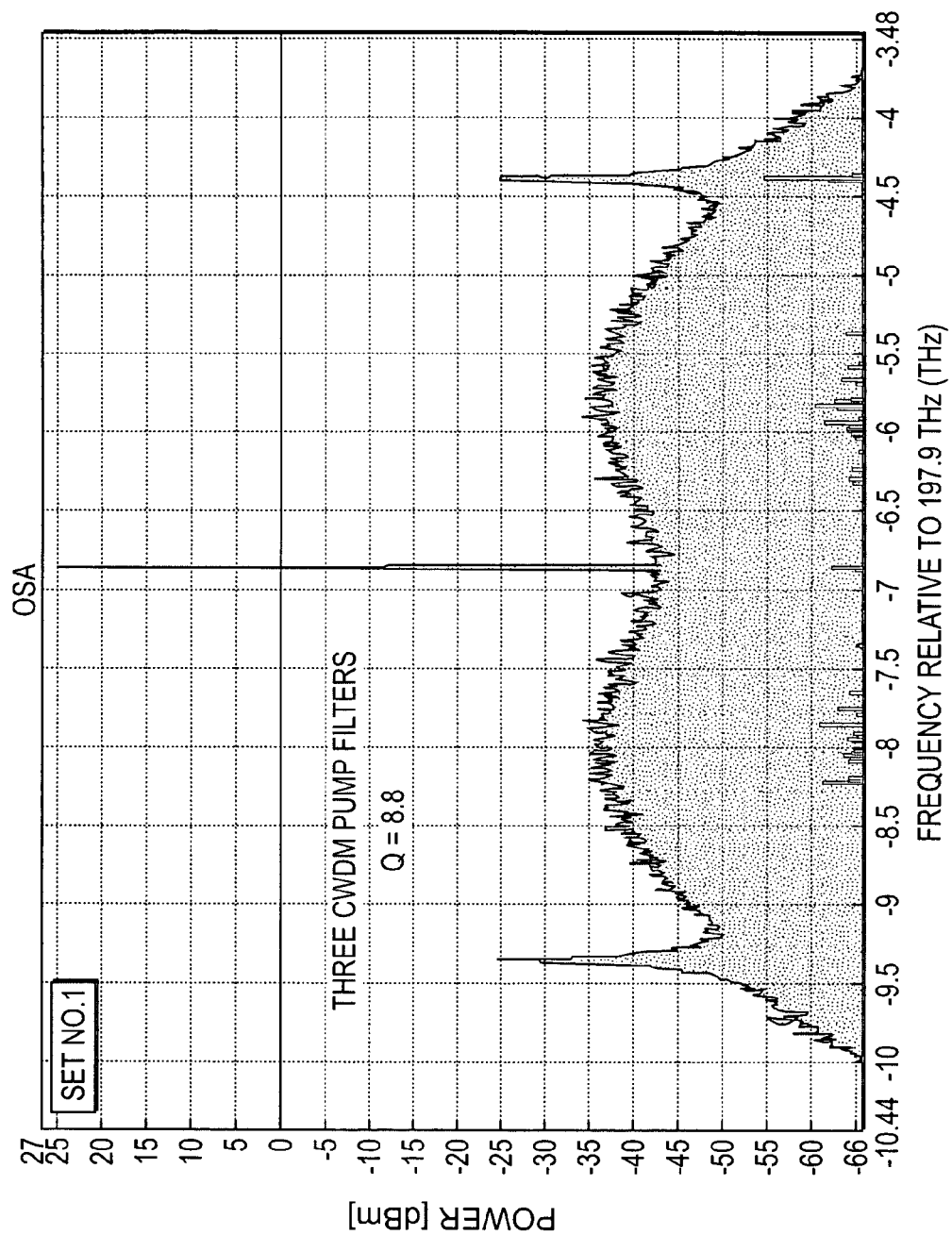
FIG. 3 is a plot of small signal optical parametric amplifier at a highly non-linear fiber output.

With reference now to FIG. 3, shown is a OSA Plot at HNLF Output for the small signal OSA 10 shown in FIG. 1. As seen, the parametric gain provided yields −25 dBm at the small signal OPA 10 output, with more gain available through a further increase in pump frequency. More important was the reduction in ASE at the HNLF input, with attendant increase in OSNR and Q. The wide separation between the pump and signal frequencies makes the OPA phase-insensitive by ensuring that the pump and signal "walk through" each other at a rapid rate.

Alternative small signal OPA embodiments are described as follows. For certain applications, these alternative embodiments may be preferable. The primary design feature of one alternative embodiment is the use of a high-power pump laser directly into a phase modulator. This design minimizes the component count. Unfortunately, available phase modulators are rated to handle only 200 mW of power and impose about a 4 dB insertion loss penalty, which makes it difficult to achieve the required pump power at the input to the HNLF. Also, pump source lasers of the requisite line widths are only available up to 50 mW. High-power pump sources and phase modulators are possible, but both would be custom items, and the resulting design would have no performance advantage over the embodiment described with reference to FIG. 1.

Another alternative embodiment utilizes several pump sources at one wavelength combined through a lens and collimator system. This setup requires that all of the pump sources be at exactly the same frequency and combined in phase. This condition would be very difficult to achieve in practice. Also, modeling results show that, even with the narrowest pumps available, the spectral content of the different pumps create mixing products that would swamp a small communications signal.

Yet another alternative embodiment utilizes pump sources at different wavelengths combined through an AWG or lens and collimator system. This alternative OPA works, but the pump mixing products render much of the signal band unusable. The input signal and idler must be carefully positioned among these mixing products. In addition, separating the pumps in the frequency domain limits the frequency shift of the OPA, which in turn limits the spectral range of operation and may preclude the use of otherwise desirable filtering component.

One other alternative embodiment couples a low power pump source through a sinusoidally excited phase modulator into an EDFA booster amplifier with an ASE filter at the output of the EDFA. With this arrangement, the discrete spectral components of the pump mix with each other and significantly degrade OSNR at the output of the EDFA.

These embodiments and the embodiment shown in FIG. 1 may be used with a variety of applications. For example, the small signal OPA 10 may be used at the end of a long span transmission fiber, e.g., at the receiver end of a transmission fiber under a Great Lake or similar distances. Likewise, the small signal OPA 10 may be used to receive and amplify an optical line of sight signal at the receiver end. Such an application, of course, would suffer the disadvantages of air spreading loss and the background noise effects of the Sun. Any application, limited only by imagination, may utilize the small signal OPA 10 to receive and parametrically amplify a small signal at the receiver end of a transmission chain.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A small-signal optical parametric amplifier (OPA) comprising:
   a narrowband pump source, wherein the narrowband pump source produces a pump output;
   means for suppressing stimulated Brillouin scattering (SBS), coupled to the narrowband pump source;

a booster amplifier, coupled to the SBS-suppressed pump output, wherein said booster amplifier amplifies said SBS-suppressed pump output to a sufficient power level for achieving parametric gain;

a bandpass filter, coupled to the booster amplifier, wherein the bandpass filter bandpass filters the amplified, SBS-suppressed pump output and suppresses amplified spontaneous emission (ASE) in the pump output;

a low-loss coupler, coupled to the bandpass filter and the receiving end of a small-signal transmission line, wherein said low-loss coupler couples the filtered, amplified, SBS-suppressed pump output with a small-signal received from the small-signal transmission line; and means for performing non-linear mixing, coupled to the injection coupler, wherein the non-linear mixing means parametrically amplifies the small-signal with the filtered, amplified, SBS-suppressed pump output to produce an amplified output signal.

2. The OPA of claim 1 wherein said means for suppressing SBS comprises phase modulator.

3. The OPA of claim 1 wherein said booster amplifier comprises an erbium-doped fiber amplifier (EDFA).

4. The OPA of claim 1 wherein said means for performing non-linear mixing comprises a highly non-linear fiber (HNLF).

5. The OPA of claim 1 wherein said low-loss coupler is an injection coupler.

6. The OPA of claim 1, further comprising:
a high-power filter, coupled to said non-linear mixing means, wherein the high-power filter filters the amplified output signal to provide pump isolation.

7. The OPA of claim 6, wherein the high-power filter includes a coarse wavelength division multiplexer (CWDM).

8. The OPA of claim 2, further comprising:
a noise-source, coupled through a low-pass filter to an input of said, phase-modulator wherein the noise-source provides noise to said phase-modulator in order to suppress SBS.

9. The OPA of claim 8, wherein the noise-source is a Gaussian noise-source.

10. The OPA of claim 1, wherein said bandpass filter includes three fused coarse wavelength division multiplexers (CWDMs) in series.

11. The OPA of claim 1, wherein said low-loss coupler includes a four-channel fused CWDM.

12. The OPA of claim 1 coupled to a narrowband filter, wherein the narrowband filter filters the amplified output signal.

13. The OPA of claim 1, wherein said means for performing non-linear mixing has a length (L) between 500 to 1500 meters long.

14. The OPA of claim 1, wherein the narrowband pump source is a fiber laser.

15. The OPA of claim 1, wherein the filtered, amplified, SBS-suppressed pump output has a pump power of between 0.22 W and 0.71 W at an input of said means for performing non-linear mixing.

16. The OPA of claim 1, wherein the amplified output signal has a signal strength of approximately −25 dBm.

17. A method for parametrically amplifying a small-signal, comprising:
generating a narrowband pump output;
suppressing stimulated Brillouin scattering (SBS) in the narrowband pump output;
amplifying the SBS-suppressed pump output to a sufficient power level for achieving parametric gain;
bandpass filtering the amplified, SBS-suppressed pump output, wherein the bandpass filtering suppresses amplified spontaneous emission (ASE) in the pump output;
coupling the filtered, amplified, SBS-suppressed pump output with a small-signal received from a small-signal transmission line; and
parametrically amplifying the small-signal with the filtered, amplified, SBS-suppressed pump output in a highly non-linear fiber (HNLF) to produce an amplified output signal.

18. The method of claim 17 wherein the SBS-suppression step comprises phase-modulating the narrowband pump output.

19. The method of claim 17 wherein amplifying step amplifies the SBS-suppressed pump output to approximately one (1) watt (W).

20. The method of claim 17, further comprising:
high-power filtering the amplified output signal to provide pump isolation.

21. The method of claim 17, wherein the SBS-suppression step includes:
providing noise from a noise-source;
low-pass filtering the noise; and,
phase-modulating the narrowband pump output with the low-pass filtered noise in order to suppress SBS.

22. The method of claim 21, wherein the providing noise step provides noise from a Gaussian noise-source.

23. The method of claim 17, wherein the amplifying step amplifies the SBS-suppressed output with an EDFA.

24. The method of claim 17, wherein bandpass filtering is performed by three fused fiber CWDM in series.

25. The method of claim 17, wherein coupling step is performed by an injection coupler that includes a four-channel fused CWDM.

26. The method of claim 17, further comprising:
narrowband filtering the amplified output signal.

27. The method of claim 17, wherein the parametrically amplifying step parametrically amplifies the small-signal with the filtered, amplified, SBS-suppressed pump output in an HNLF with a length (L) between 500 to 1500 meters long.

28. The method of claim 17, wherein the generating step generates the narrowband pump output with a fiber laser.

29. The method of claim 17, wherein the filtered, amplified, SBS-suppressed pump output has a pump power of between 0.22 W and 0.71 W.

30. The method of claim 17, wherein the parametrically amplifying step produces an amplified output signal that has a signal strength of approximately −25 dBm.

31. A method for making a small signal OPA, comprising:
identifying an input small-signal band to be amplified;
obtaining specifications for an available highly non-linear fiber (HNLF);
setting a length of the HNLF;
determining a minimum pump source power that will provide adequate gain for the length of HNLF;
calculating a range of pump wavelengths that will provide gain across the input small-signal band;
specifying pump source according to calculated pump wavelength range;
determining appropriate parameters for a noise source and phase modulator;
specifying a source for the input small-signal, a booster amplifier, an injection coupler, and high-power filter;
cutting the HNLF to the length set; and
constructing the small signal OPA, the constructing step coupling the pump source and noise source to inputs of the phase modulator, an output of the phase modulator to an input of the booster amplifier, an output of the booster amplifier and the input small-signal to inputs of the injection coupler, an output of the injection coupler to an input end of the HNLF, and an output end of the HNLF to an input of the high-power filter.

32. The method of claim 31, further comprising:
measuring a zero dispersion wavelength ($\lambda_o$) of the HNLF.

33. The method of claim 31, further comprising:
calculating or estimating a Brillouin gain threshold for the HNLF.

34. The method of claim 31, further comprising:
determining whether or not polarization control will be used.

35. The method of claim 31, wherein the setting the length of the HNLF includes determining whether a low-power or low-cost design is to be pursued and setting the length accordingly.

36. The method of claim 31, further comprising:
calculating how the small signal OPA will perform over an expected operating temperature range.

37. The method of claim 36, further comprising:
determining a packaging design for the small signal OPA, wherein the determining a packaging design step uses results of the calculating step.

38. The method of claim 31, further comprising:
modeling operation of the small signal OPA operation over an expected range of input small-signal variation; and,
making necessary adjustments to the small signal OPA based on the modeling to achieve desired results.

* * * * *